UNITED STATES PATENT OFFICE.

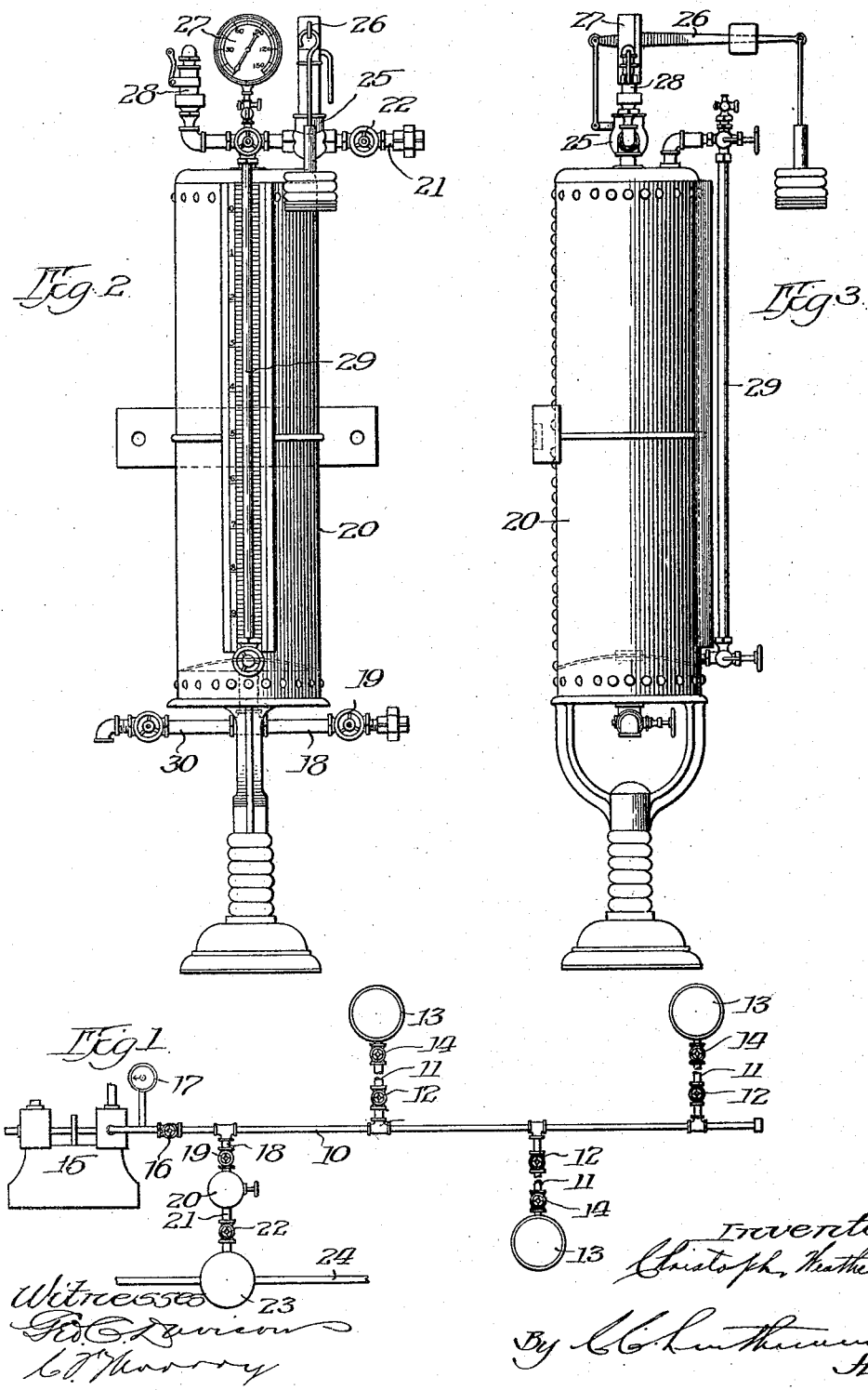

CHRISTOPHER WEATHERSON, OF CHICAGO, ILLINOIS.

METHOD OF AND APPARATUS FOR DETECTING AND MEASURING LEAKAGE IN PIPE-LINES.

1,196,828.  Specification of Letters Patent.  Patented Sept. 5, 1916.

Application filed June 19, 1916. Serial No. 104,354.

*To all whom it may concern:*

Be it known that I, CHRISTOPHER WEATHERSON, a citizen of the United States, and resident of Chicago, in the county of Cook and State of Illinois, have invented certain new and useful Improvements in Methods of and Apparatus for Detecting and Measuring Leakage in Pipe-Lines, of which the following is a specification.

My invention has reference to a novel method and apparatus for detecting and measuring leakage in the lines for delivering fuel oil to furnaces of the different types in use in and about metal working plants.

It is common in steel and iron plants to employ oil as a fuel for operating the reheating, open hearth or other types of furnaces, the fuel being piped to the furnaces, the pressure being maintained constant by means of a suitable pump. It is not uncommon for leakages to occur in the line, and, without suitable means for detecting such leakages, the loss may continue for a long time without it becoming known. Particularly is this true when the pipes are underground, as is the common practice.

My invention comprises means adapted to be interposed in the line at some point and which may be connected by the turning of a few valves to determine with accuracy even the slightest loss and to locate the same with reasonable certainty.

The method and the apparatus by which it is carried out will be better understood by reference to the accompanying drawings, wherein—

Figure 1 is a diagrammatic view showing a pipe line with the pump and associated mechanism such as contemplated by me for determining leakage; Fig. 2 is an elevation of the apparatus which is associated with the piping, and Fig. 3 is an elevation taken at right angles to that of Fig. 2.

In the preferred embodiment of my invention I provide a main 10, having branches or laterals 11, which may be disconnected by means of the valves 12. These branches may serve to feed fuel to furnaces indicated diagrammatically at 13, the burner being controlled by the valve 14. An oil pump 15 is connected to the main 10, a valve 16 serving to disconnect the pump as required. A pressure gage 17 is provided in the main in order to indicate the pressure of the oil under normal conditions.

The devices heretofore described are such as are in common use in manufacturing plants at the present time. My improvements consist in connecting a branch 18, controlled by a valve 19, and serving to connect the tank 20, as best shown in Figs. 2 and 3, with the main line. A branch 21, having a valve 22 therein, connects the tank to an air pump 23, which supplies a constant high pressure of air to the main 24, for use throughout the plant as required.

Referring now to Figs. 2 and 3, it will be seen that when the valve 19 is open oil from the main 10 may enter the tank, the inlet being located at the bottom. The air pressure supplied to the tank at the top is regulated and limited by a reducing valve 25 of a common type, the valve being controlled by the weight carried by the arm 26, to the end that any desired degree of reduction in pressure may be secured. A gage 27 indicates the pressure which is being supplied to the tank while the safety or blow-off valve 28 prevents the entrance of an excessive pressure to the tank which might occur should the reducing valve fail to operate. Located at the side of the tank is a gage glass 29 and back of the glass is an indicator or scale which is calibrated to gallons and tenths of gallons. The pipe 30 provides means for draining the tank if necessary.

The operation is as follows: Assuming that all of the furnaces are shut down by the closing of the valves 14 to the burners, there should be no further delivery of oil by the pump. At such times as the furnaces are shut down the operator notes the pressure indicated by the gage 17, that is, the normal operating oil pressure, whereupon he closes the valve 16 which disconnects the pump from the system. He has previously opened the pet cock at the top of the gage glass and the valve 19 to permit a quantity of oil to enter the tank to the level of the naught or zero on the scale back of the gage glass. He thereupon adjusts the reducing valve 25 in order to deliver a pressure of air to the top of the oil corresponding to the normal operating pressure in the pipe line as indicated by the gage 17. He then opens the valve 22 to permit air pressure to enter the tank. Thus it will be seen that the pressure conditions in the system are duplicated, although no oil is delivered at the burner and the pump is not in operation.

Any leakage will, therefore, be at once indicated by the lowering of the oil in the gage glass. Inasmuch as the scale is calibrated in gallons and tenths, the operator may by the aid of a watch determine the exact amount of leakage per unit of time. Assuming that leakage is apparent, the operator then closes the valve 12 of one of the branches. If the leakage continues, it is apparent it does not occur in that branch; this action being repeated for the different branches, it is soon apparent whether the leakage is occurring in one of the branches or in the main line and may thereupon be readily located.

The operation of determining whether there is a leakage in the system may be performed more quickly than the time required to read this description of the operation thereof; the mechanism necessary for carrying out the operation is very simple and may be found in the storerooms of all large factories; the tank and associated parts may be located at any inconspicuous place, it being only necessary to connect the same to the oil main by a single pipe.

The construction and operation of the device is such as to readily lend itself to modifications and such modifications as are within the scope of my claims I consider within the spirit of my invention.

I claim:

1. The method of detecting leakage in oil conveying pipe lines which comprises discontinuing the delivery of oil, shutting off the supply of oil, then duplicating the pressure conditions of normal operation in said line, then observing the lessening of a measured quantity of oil in said line to determine the extent of leakage.

2. The method of detecting leakage in oil conveying pipe lines which comprises discontinuing the delivery of oil from said line, isolating said line from the supply, then providing a measured quantity of oil and connecting such quantity with said line, then duplicating the pressure conditions in said pipe line as they exist in normal operation and continuing such conditions for a unit of time, then determining the leakage or loss by the reduction in the quantity of said measured quantity of oil, substantially as described.

3. Apparatus for determining leakage in pipe lines comprising a main, branches, a pump, a valve for disconnecting said pump from said main, a tank connected to said main and provided with a gage, means for supplying air pressure to said tank at the pressure of normal operation of the pump, and a valve for connecting said tank to said main when a leakage test is to be conducted, substantially as described.

4. In a leakage detecting and measuring device, the combination of an oil conveying main having a plurality of outlets, valves controlling the passage of oil to said outlets, a pump, means for disconnecting said pump from said main, a tank, a valve connection from said tank to said main, a source of air pressure communicating with said tank and a reducing valve in said air connection whereby said oil pump may be disconnected and the pressure conditions in said system be duplicated by means of air pressure, the extent of leakage being indicated by the reduction in the quantity of oil in said tank, substantially as described.

Signed at Chicago, Illinois, this 16 day of June, 1916.

CHRISTOPHER WEATHERSON.

Witnesses:
 EDUARD CAPOUCH,
 E. A. SMITH.

Copies of this patent may be obtained for five cents each, by addressing the "Commissioner of Patents, Washington, D. C."